US012422015B2

(12) United States Patent
Pecar (10) Patent No.: US 12,422,015 B2
(45) Date of Patent: Sep. 23, 2025

(54) DAMPERS

(71) Applicant: TITUS D.O.O. DEKANI, Dekani (SI)

(72) Inventor: David Pecar, Pobegi (SI)

(73) Assignee: TITUS D.O.O. DEKANI, Dekani (SI)

( * ) Notice: Subject to any disclaimer, the term of this patent is extended or adjusted under 35 U.S.C. 154(b) by 702 days.

(21) Appl. No.: 17/790,481

(22) PCT Filed: Jan. 6, 2021

(86) PCT No.: PCT/EP2021/050142
§ 371 (c)(1),
(2) Date: Jun. 30, 2022

(87) PCT Pub. No.: WO2021/144177
PCT Pub. Date: Jul. 22, 2021

(65) Prior Publication Data
US 2023/0040164 A1     Feb. 9, 2023

(30) Foreign Application Priority Data
Jan. 13, 2020   (GB) ...................................... 2000449

(51) Int. Cl.
*F16F 9/516*     (2006.01)
*F16F 9/34*      (2006.01)
*F16F 13/00*     (2006.01)

(52) U.S. Cl.
CPC ................ *F16F 9/516* (2013.01); *F16F 9/34* (2013.01); *F16F 13/002* (2013.01)

(58) Field of Classification Search
CPC ............. F16F 9/34; F16F 9/516; F16F 13/002

USPC ......................................... 188/288, 289, 316
See application file for complete search history.

(56) References Cited

U.S. PATENT DOCUMENTS

| 6,957,807 | B2 * | 10/2005 | Zimmer | .................... E05F 5/10 |
| | | | | 267/64.11 |
| 9,677,640 | B2 * | 6/2017 | Svara | ..................... F16F 9/3228 |
| 9,695,899 | B2 * | 7/2017 | Smith | ....................... F16F 9/22 |
| 9,964,171 | B2 * | 5/2018 | Firek | ..................... F16F 9/5126 |
| 10,711,860 | B2 * | 7/2020 | Ashiba | .................. F16F 9/3214 |

(Continued)

FOREIGN PATENT DOCUMENTS

| EP | 2546443 A | 1/2013 |
| FR | 1012219 A | 7/1952 |

(Continued)

OTHER PUBLICATIONS

International Search Report issued in corresponding International Application No. PCT/EP2021/050142 mailed Apr. 8, 2021 (5 pages).

(Continued)

*Primary Examiner* — Christopher P Schwartz
(74) *Attorney, Agent, or Firm* — Lathrop GPM LLP (57) ABSTRACT

A piston and cylinder type damper with a cylinder containing damping fluid. The damper is operable to perform a compression stroke and a return stroke. A piston rod that can engage with both a piston assembly and a return means. A sealing element is movable axially with respect to said piston rod such that said sealing means is operable to engage with both said piston assembly and said return means, such that, in said compression stroke the sealing means engages solely with said piston assembly, and in said return stroke engages solely with said return means.

16 Claims, 5 Drawing Sheets

(56) References Cited

U.S. PATENT DOCUMENTS

| | | | |
|---|---|---|---|
| 11,187,298 B2 | 11/2021 | Mallin | |
| 2003/0213663 A1* | 11/2003 | Salice | E05F 5/08 |
| | | | 188/284 |
| 2005/0279596 A1 | 12/2005 | Gassner | |
| 2011/0253493 A1* | 10/2011 | Svara | F16F 9/3228 |
| | | | 188/313 |
| 2016/0076618 A1* | 3/2016 | Svara | F16F 9/52 |
| | | | 188/316 |
| 2017/0089417 A1* | 3/2017 | Pecar | F16F 9/368 |
| 2021/0048083 A1* | 2/2021 | Stravnik | F16F 9/3228 |

FOREIGN PATENT DOCUMENTS

| | | |
|---|---|---|
| GB | 681416 A | 10/1952 |
| GB | 2498747 A | 7/2013 |
| TW | 201013068 A | 4/2010 |
| WO | 2019145071 A | 8/2019 |

OTHER PUBLICATIONS

Written Opinion of the International Searching Authority issued in corresponding Application No. PCT/EP2021/050142 mailed Apr. 8, 2021 (8 pages).

* cited by examiner

DAMPERS

RELATED APPLICATIONS

This application claims priority to Patent Cooperation Treaty application number PCT/EP2021/050142, filed Jan. 6, 2021, which claims priority to Great Britain patent application number 2000449.5, filed Jan. 13, 2020, the entireties of which are hereby incorporated by reference.

FIELD

The present invention relates to dampers.

BACKGROUND

It is more and more prevalent for furniture items to include dampers to aid closing drawers and doors. It is desirable to attempt to reduce the size of said dampers. However, it is essential to retain high damping performances. It is also important to ensure that the dampers are reliable.

A known damper is disclosed in GB 2498747. The damper comprises a piston assembly that is shown in situ in FIGS. 1 and 3, and in close up in FIGS. 2 and 4. The piston assembly comprises upper and lower flanges (see features 14a, 14b). The outer diameter of the upper and lower flanges is slightly less than the bore of the cylinder. Accordingly, the piston assembly is able to move freely within the cylinder along its longitudinal axis. It also means that there is a small gap between the flanges and the cylinder, which constitutes a pathway for the passage of damping fluid between the upper and lower chambers.

The upper and lower flanges are spaced apart axially and in the space between them is located an O-ring. The O-ring is in sealing engagement with the bore of the cylinder, but not with the piston assembly. The piston assembly has a hole therethrough, which allows a fluid communication pathway between the upper and lower chambers.

Figure 1:
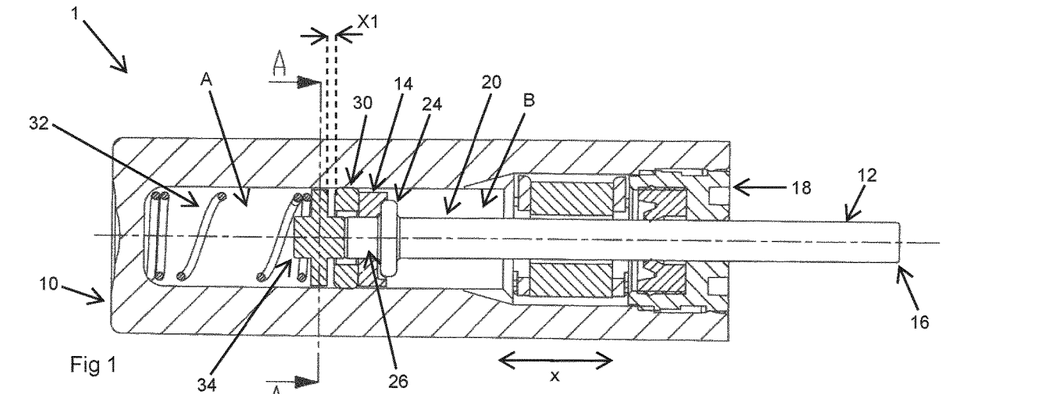
FIG. 1 shows a cross section of a damper of a first embodiment showing a compression stroke.

In operation, the assembly will normally be in the position seen in FIG. 1, with its piston rod fully extended from the cylinder. When the distal end of the piston rod is struck, e.g. by a closing door, this will cause the piston rod to force the piston assembly towards the closed end of the cylinder, against the bias of a spring. At the same time, the upper flange (feature 14a) will move into engagement with the O-ring, thus closing off the fluid pathway between the upper flange and the cylinder. Thereupon, the only remaining pathway for the passage of damping fluid from the lower chamber to the upper chamber is through the gap between a counterbore in the piston assembly and the inner end of the piston rod. This restricted flow of damping fluid between the two chambers provides a damped restrictive force to the movement of the piston rod. When the force on the distal end of the piston rod has dissipated, the piston rod will be returned to its extended position by the biasing force of the spring acting on the piston assembly. This movement moves the O-ring from its engagement with the upper flange (feature 14a) into engagement with the lower flange (feature 14b). In this position, a far greater degree of fluid communication is opened up between the two chambers. This greatly eases the flow of damping fluid across the piston assembly and thus means that on the return movement of the piston rod, there is little effective damping resistance.

SUMMARY

It would be advantageous to improve over the above design. It would be particularly advantageous to be able to make a damper that is more compact, in respect of both length and diameter, whilst still retaining a high level of damping ability.

According to the present invention there is provided a piston and cylinder type damper having a cylinder containing damping fluid operable to perform a compression stroke and a return stroke, the damper comprising:

A piston rod engagable with a piston assembly and a return means, wherein a sealing element is movable axially with respect to said piston rod such that said sealing means is operable to engage with both said piston assembly and said return means, such that, in said compression stroke the sealing means engages solely with said piston assembly, and in said return stroke engages solely with said return means.

The present arrangement reduces the overall length of the damper by making the piston assembly smaller. The piston assembly is not required to urge the sealing means back to its starting position during the return stroke. As such the piston assembly can comprise a reduced length, with respect to previous arrangements.

Additionally, in the acknowledged prior arrangement, the piston assembly, the sealing means and the return flange (feature 14b) are all mounted on the piston rod. This can cause co-axial problems over significant use, potentially requiring the damper unit to be replaced. Accordingly, the piston assembly is required to be of a certain diameter. In the present arrangement only the piston assembly is mounted on the piston rod, and hence a reduction in diameter of the damper is possible.

Preferably the return means comprises a spring. It is preferred that the spring engages with the piston rod either directly or indirectly via a support member. By adapting the return means to actively engage with the sealing means, and not to directly engage with the piston assembly, the damper can be constructed with a reduced length.

It is preferred that the return means contactly engages with the piston rod during the compression and return strokes. The piston rod engages with piston assembly, however, there is no engagement between the piston assembly and the return means. The sealing means is retained between the return means and the piston assembly. It is retained in a floating arrangement with the return means and the piston assembly being the limits of its path of travel.

Preferably the piston assembly comprises an aperture therethrough. It is particularly preferred that the piston assembly comprises a flow channel that substantially encircles the aperture. The flow channel may be on the side of the piston assembly that faces the piston rod. Alternatively, the flow channel may be on the side of the piston assembly that faces the return means. By providing a flow channel with such dimensions, the path of travel of the damping fluid during the compression stroke is long with respect to the overall length of the damper.

It is preferred that the piston assembly comprises a counterbore located around the aperture. The piston rod may comprise a flange operable to cooperate with the counterbore.

In a preferred arrangement the piston assembly can comprise a flow channel on both sides. Specifically, a flow channel may be provided on the side of the piston assembly that faces the piston rod, and a second flow channel may be on the side of the piston assembly that faces the return means.

It is preferred that the sealing means is an O-ring. In one embodiment the O-ring may comprise one or more protrusions to allow the O-ring to flex or deform during the return stroke. In a further preferred arrangement the O-ring may comprise grooves either side of the one or more protrusions. Such grooves aid the O-ring to flex or deform.

Alternatively, the piston assembly may comprise one or more protrusions. In this case, the O-ring, which may be of standard design, would flex during the compression stroke.

The O-ring is not mounted on the piston assembly. Accordingly, the aperture therethrough can be of reduced diameter.

According to a second aspect of the present invention there is provided a piston assembly comprising a first face operable to engage with a piston rod and a second face operable to engage with a return means, wherein the first face comprises a first flow channel. The piston may be utilized with a damper. The flow channel provides a route for damping fluid to travel when the damper is being compressed.

It is preferred that the piston assembly comprises an aperture therethrough. The aperture is preferably defined by an inner surface. It is also preferred that the first face comprises a counterbore.

Preferably the first flow channel substantially surrounds the aperture. It is also preferred that the first flow channel is located within the counterbore. It is further preferred that the first flow channel comprises a portion through the inner surface of the piston assembly.

Preferably the second face comprises a second flow channel. It is preferred that the second flow channel substantially encircles the aperture.

It is preferred that the first and second flow channels are connected by a through-hole. By providing two flow channels in communication, a long fluid path for damping fluid may be provided. However, as the fluid path comprises two circular paths on either side of the piston assembly the overall length of the piston assembly can be reduced. This allows the damper to be made smaller.

Preferably the first and second faces of the piston assembly are connected by an outer peripheral surface. In a preferred arrangement the outer peripheral surface may comprises one or more grooves.

According to a third aspect of the present invention there is provided a piston and cylinder type damper operable to perform a compression stroke and a return stroke, the damper comprising: a piston rod; a piston assembly, and a return means, wherein the piston rod and the return means are operable to engage in both the compression and return strokes independent of the piston assembly.

It is preferred that the return means comprises a spring. It is also preferred that a portion of the piston rod is operable to pass through an aperture in the piston assembly and directly engage with the spring.

In an alternative embodiment the return means and the piston rod may engage via a support member.

In order that the present invention be more readily understood, specific embodiments thereof will now be described in relation to the following drawings.

DETAILED DESCRIPTION

Figure 3:
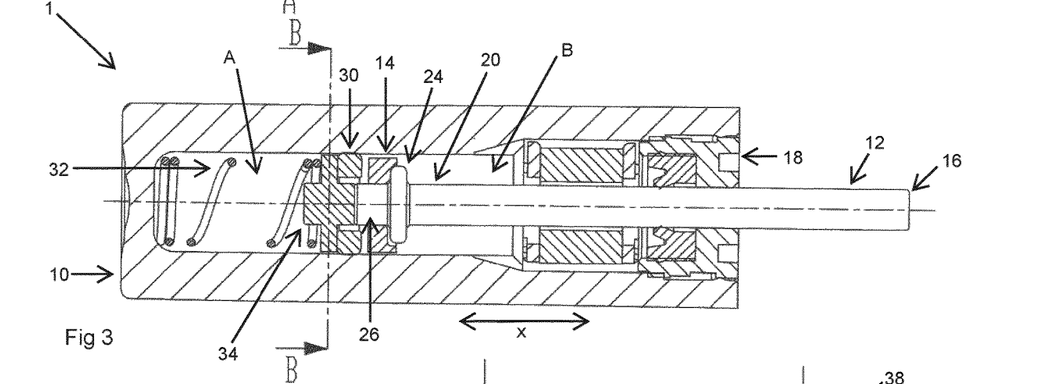
FIG. 3 shows a cross section of a damper of a first embodiment showing a return stroke.

FIGS. 1 and 3 show a linear piston and cylinder type damper 1. The damper 1 comprises a cylinder 10 that houses a piston rod 12 and a piston assembly 14. The cylinder 10 is typically of circular cross-section and is closed at one end. The cylinder contains a damping fluid, such as oil or silicone. The piston rod 12 is mounted for linear reciprocal movement with respect to the cylinder 10 along its longitudinal axis x. A free end 16 of the piston rod 12 extends out of the cylinder 10 at its other end, which is closed off by a cap assembly 18. The cap assembly 18 provides support for the slidable mounting of the piston rod 12 and has a suitable seal to prevent leakage of damping fluid out of the cylinder 10.

The piston assembly 14 comprises a central aperture therethrough. The central aperture comprises an inner surface 56.

The piston rod 12 extends into the interior of the cylinder 10, where its inner end 20 engages the piston assembly 14. The inner end 20 of the piston rod 12 is received in a counterbore 22 in the piston assembly 14.

A collar 24 on the piston rod 12 at its inner end 20 provides an annular reaction surface to help spread loads transmitted to the piston assembly 14. The collar 24 may be formed integrally with the piston rod 12, for example by stamping, or it may be formed separately and attached by suitable means.

The piston assembly may comprise a counterbore 22 operable to receive the collar 24 of the piston rod 12. This helps to provide lateral support for the inner end of the piston rod and guide it in its reciprocal movement along axis x. However, the counterbore is optional, and it is envisaged that the piston rod 12 could engage with a flush surface of the piston assembly 14. By providing a piston assembly 14 that presents a substantially flat surface to the piston rod 12, it may be possible to provide a shorter piston assembly 14.

The portion of the piston rod 12 advanced from the collar 24 is termed the piston rod pin 26. The piston rod pin 26 is shaped to be able to pass through the aperture in the piston assembly 14.

Figures 7, 8:
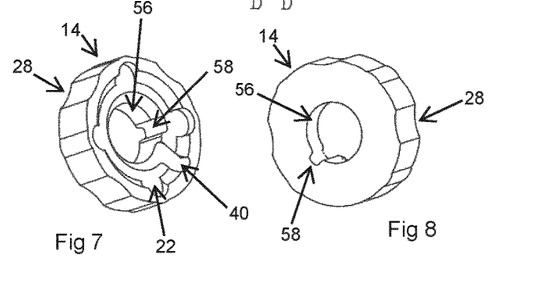
FIG. 7 shows a first view of a piston assembly.
FIG. 8 shows a second view of the piston assembly of FIG. 7.

The piston assembly 14 divides the interior of the cylinder into two separate chambers, in FIG. 1 left and right chambers A and B, respectively, and contains a pathway for controlled flow of damping fluid between them. The outer diameter of the piston assembly 14 is slightly less that the bore of the cylinder 10. Accordingly, the piston assembly 14 is able to move freely within the cylinder 10 along its longitudinal axis. The piston assembly 14 has grooves 28 on its outer surface that aids damping fluid to flow between the chambers. These grooves are shown in FIGS. 7 and 8.

When the free end 16 of the piston rod 12 experiences an impact tending to compress the damper, the force of the impact will be transmitted via the collar 24 of the piston rod 12 to the piston assembly 14 to drive it into the cylinder 10. This will bring the piston assembly 14 into sealing engagement with a seal 30. In this embodiment the seal 30 is an O-ring. This effectively seals off the gap around the outside of the piston assembly 14. Put another way, the path around the perimeter of the piston assembly is closed off to the damping fluid, leaving the pathway through the piston assembly 14 as the only possible route for flow of damping fluid out of the left-hand chamber A. By controlling the amount of restriction that the pathway presents, the flow through the piston assembly 14 can be tailored to give the desired amount of damped resistance that the damper 1 will produce to the inward movement of the piston rod 12. This is the compression stroke of the damper 1.

On the return stroke, ie on the outward movement of the piston rod 12, the seal 30 will move out of engagement with the piston assembly 14, thereby opening up an additional pathway for flow of fluid around the outside of the piston assembly 14 through the grooves 28. This is a much larger pathway, meaning that fluid is free to return to the left-hand chamber B rapidly and substantially without any damping resistance.

The return stroke is aided by the provision of a return means 32. In the present case the return means 32 may comprise a spring 32 that either directly or indirectly engages with the piston rod pin 26. The embodiment shown in FIGS. 1 to 8 includes a return means 32 that comprises a spring 32 and a support member 34. The spring 32 is arranged to urge the support member 34 towards the end cap 18.

Figure 5:
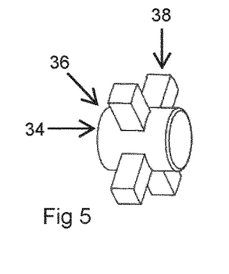
FIG. 5 shows an example of a support member that can comprise part of a return means.
Figure 6:
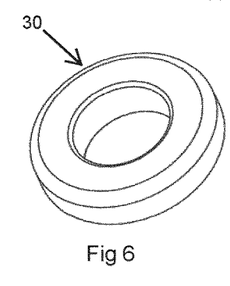
FIG. 6 shows an example of a sealing means.

The support member 34 of the present embodiment comprises a cylindrical main body 36 with four ribs 38 extending axially therefrom. The arrangement is shown in FIG. 5. More or fewer ribs would be possible, but four ribs 38 provide the optimum stability and performance.

In known arrangements the piston assembly retains the seal between first and second members, with one of the members engaging with the seal during respective compression and return strokes. However, in the present invention the piston assembly 14 only engages with the seal 30 in the compression stroke. Here, during the compression stroke, the piston rod pin 26 engages with the cylindrical main body 36 of the support member 34 through the diameter of the O-ring 30. The O-ring 30 is engaged by the piston assembly 14. The O-ring 30 is separated from the ribs 38 of the support member 34 by a distance X1. This distance is a minimum movement of the O-ring between the compression stroke and the return stroke.

Further, due to the fact that the O-ring 30 is not maintained on the piston assembly 14, the diameter of the aperture through the O-ring 30 can be made smaller. As such it is possible to reduce the total diameter of the damper 1.

Figure 2:
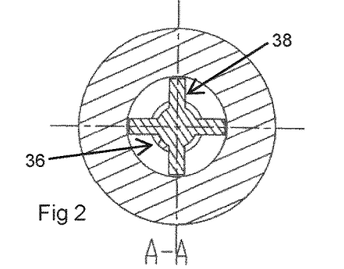
FIG. 2 shows a cross section of the damper of FIG. 1 through the line A-A.
Figure 4:
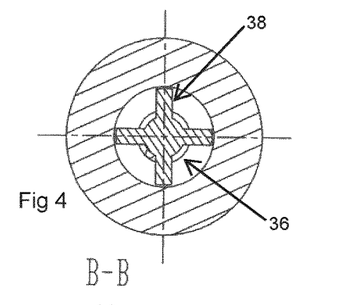
FIG. 4 shows a cross section of the damper of FIG. 1 through the line B-B.

FIGS. 2 and 4 show a cross-section through the support member 34. As will be appreciated, the shape of the support member 34 and its engagement with the seal 30 allows for the damping fluid to pass through easily on the return stroke. As will be apparent from FIG. 3, during the return stroke there is a distance Y1 between the O-ring 30 and the piston assembly 14. Because the damping fluid can readily pass between the O-ring 30 and the ribs 38 of the support member 34 this distance can be kept short, relative to known arrangements.

The piston assembly 14, as shown in FIG. 7, shows a flow channel 40 that allows damping fluid to flow between the two chambers of the damper 1 when the piston assembly 14 is engaged with the O-ring 30. The flow channel 40 further comprises a chamfered channel that substantially surrounds the main aperture through the piston assembly 14. The flow channel 40 comprises a flow path 58 located in the inner surface 56 of the piston assembly 14. The chamfered channel culminates in an outlet that allows the damping fluid to pass from chamber A to chamber B. The length of travel of the damping fluid is thus longer than in conventional arrangements, and hence allows for a physically shorter damper; the fluid is still being forced along a path, but said path is retained within a relatively short piston assembly be having the flow channel 40 circuit around the aperture.

It will thus be appreciated that by providing at least one of a circular groove around the aperture of the piston assembly and a return means that engages with the piston rod 12 independently of the piston assembly 14, the size of the damper 1 can be reduced. The two concepts together provide significant size reductions.

FIGS. 9 to 13 show a second embodiment. There are many similarities to the first embodiment, and these will not be described again.

Figure 9:
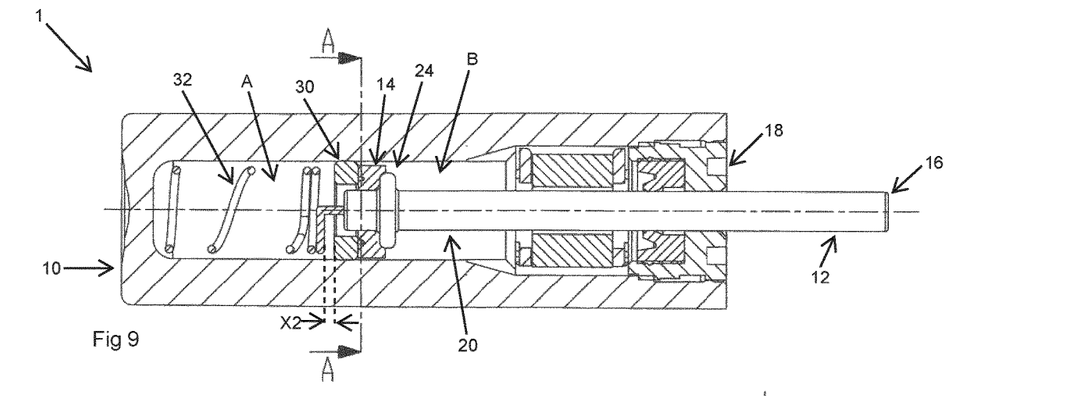
FIG. 9 shows a cross section of a damper of a second embodiment showing a compression stroke.
Figure 10:
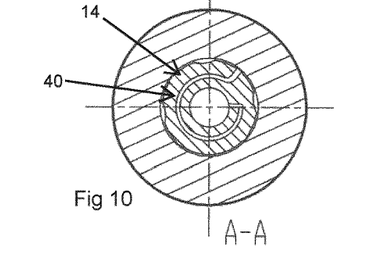
FIG. 10 shows a cross section of the damper of FIG. 9 through the line A-A.
Figure 11:
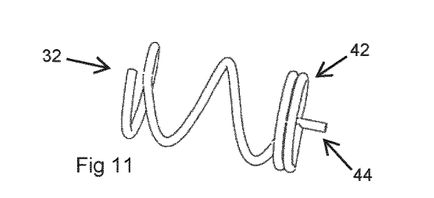
FIG. 11 shows the return means according to the second embodiment.
Figure 12:
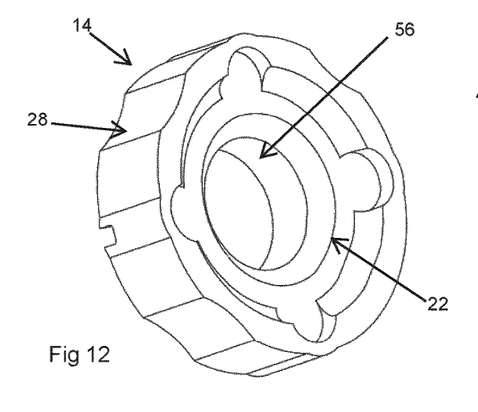
FIG. 12 shows a first view of an alternative piston assembly.
Figure 13:
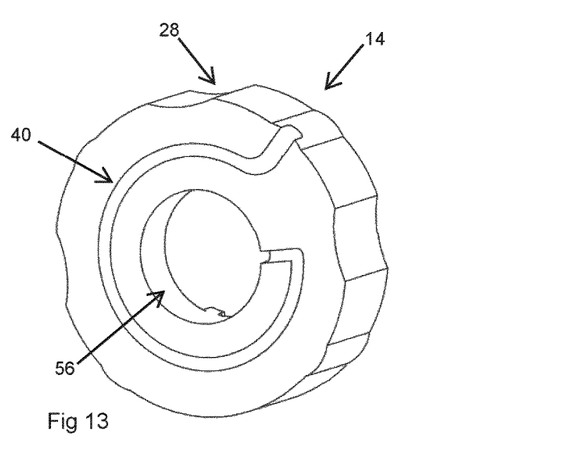
FIG. 13 shows a second view of the piston assembly of FIG. 12.

In this embodiment the return means comprises a spring 32 that directly engages with the piston rod pin 26. An example is shown in FIG. 11. The spring 32 comprises an annular portion 42 that engages with the seal 30 in the return stroke and a protruding section 44 that engages with the piston rod pin 26. FIG. 9 shows that the protruding section is such that, during the compression stroke, a distance X2 is maintained between the annular portion of the spring 42 and the seal 30. This defines the range of movement of the O-ring between the compression and return strokes. In known arrangements, the O-ring is mounted on the piston assembly, and hence a greater physical size of the piston assembly is required. By allowing the O-ring to be in floating arrangement with the piston assembly 14 and the return means 32, the overall length of the damper can be reduced.

The piston assembly 14 differs in that the flow channel 40 is located on the side directed towards the left-hand chamber. The flow path has an inlet adjacent the inner aperture of the piston assembly and an outlet proximate one of the grooves on the out edge of the piston assembly 14. In the compression stroke the piston assembly 14 is urged against the O-ring 30. As such, the only path for the damping fluid is through the flow path and into the right-hand chamber via the groove on the piston assembly. It will be appreciated that the piston assembly of FIGS. 7 and 8 could be used in this embodiment.

Figure 14:
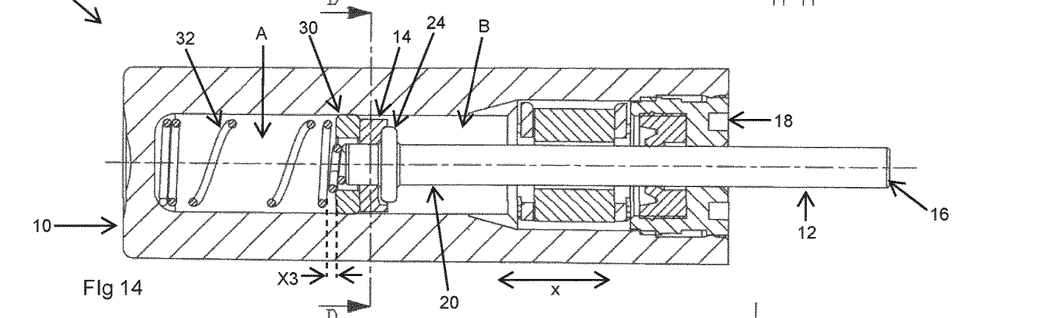
FIG. 14 shows a cross section of a damper of a third embodiment showing a compression stroke.
Figure 15:
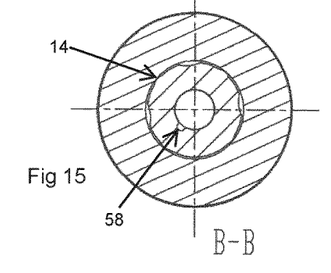
FIG. 15 shows a cross section of the damper of FIG. 14 through the line B-B.
Figure 16:
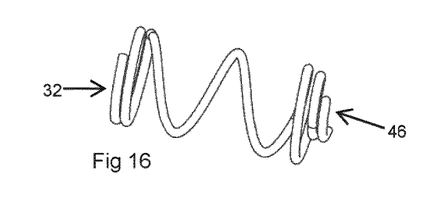
FIG. 16 shows the return means according to the third embodiment.

FIGS. 14 to 16 show a third embodiment. In this arrangement the spring 32 comprises a conical section 46, formed by the loops of the spring that serves as the protruding section of the second embodiment. The conical section 46 has a diameter less that the diameter of the aperture through the O-ring 30. The remaining spring coils have a diameter greater than that of the aperture of the O-ring 30. The conical section is of sufficient length that a distance X3 is maintained between the O-ring 30 and the first of the remaining spring coils. Such a distance is sufficient to allow damping fluid to return from chamber B to Chamber A during the return stroke.

On the return stroke the conical section of the spring 32 allows damping fluid to flow freely through the aperture in the seal 30 and over the spring 32 back into chamber A.

This embodiment may use a piston assembly 14 as shown in either FIGS. 7 & 8 or FIGS. 12 & 13.

Again, in this embodiment the damper 1 can be of reduced size, relative to the prior art, by allowing the O-ring 30 to float between the return means and the piston assembly during operation.

Figure 20A:
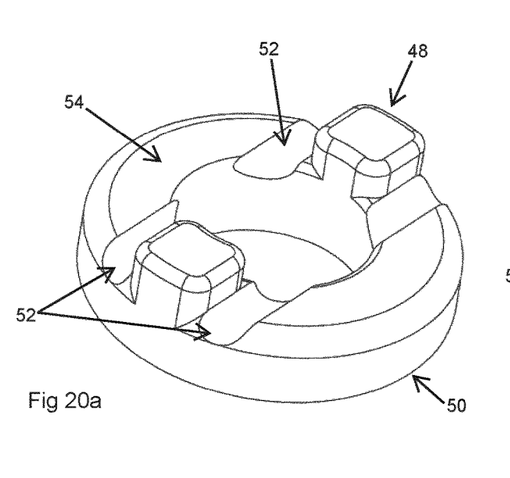
FIG. 20a shows a variant of the sealing means of FIG. 20.

A fourth embodiment is shown in FIGS. 17 to 20. In this embodiment the return means 32 comprises a spring 32 that engages directly with the O-ring 30. The O-ring 30 comprises a pair of protrusions or spigots 48 that allow deformation of the flat side 50 of the O-ring 30. The spigots 48 face the return spring 32, and engage therewith to cause the O-ring 30 to deform in the return stroke so as to cause the damping fluid to more easily flow from the first chamber A to the second chamber B. The spigots 48 extend from the return means facing surface 54 of the O-ring 32. A variant of this O-ring 30 is shown in FIG. 20a. Grooves 52 are provided on either side of the spigot 48. This arrangement promotes deformation of the O-ring 30 during the return stroke. This embodiment may use a piston assembly 14 as shown in either FIGS. 7 & 8 or FIGS. 12 & 13.

Figures 17, 18, 19, 20:
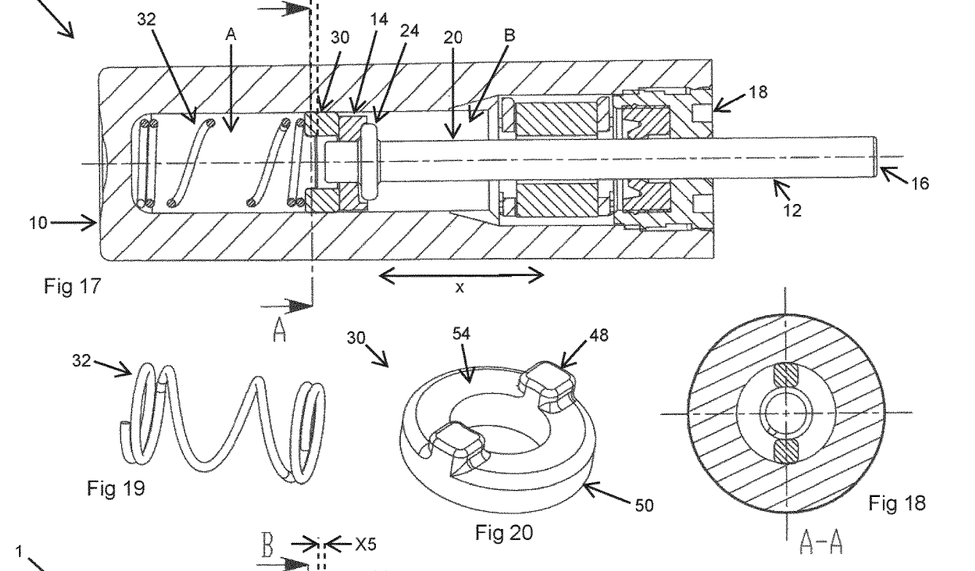
FIG. 17 shows a cross section of a damper of a fourth embodiment showing a compression stroke.
FIG. 18 shows a cross section of the damper of FIG. 17 through the line A-A.
FIG. 19 shows the return means according to the fourth embodiment.
FIG. 20 shows an alternative sealing means.

A spacing X4 is provided between the return means 32 and the return means facing surface 54 of the O-ring 30. This distance is the working range of the O-ring 30.

This arrangement differs from previous embodiments in that the return means 32 does not engage directly with the piston rod pin 26. The provision of a shaped O-ring 30 allows the O-ring to flex during the return stroke, and hence provides the necessary return passage for the damping fluid.

Figure 20B:
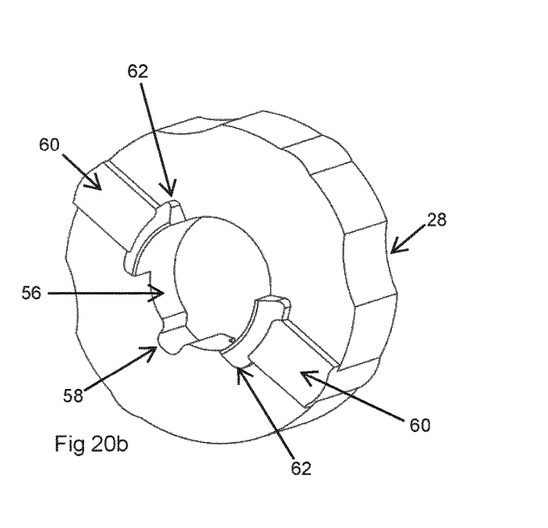
FIG. 20b shows an alternative piston assembly.

A further variant of this embodiment is shown in FIG. 20b. This figure shows a variant piston assembly 14. In this arrangement, two protrusions 60 are provided on the surface of the piston assembly that, in use, faces the return means 32. This arrangement would conveniently cooperate with a standard O-ring, such as one illustrated in FIG. 6. In this arrangement, the O-ring flexes during the compression stroke due to its interaction with the protrusions 60 located on the piston assembly 14. It will be appreciated that the O-ring would remain in an un-flexed state during the return stroke of the damper 1. The O-ring is bent over the protrusions 60 thus sealing off the pathway over the outer surface of the piston assembly 14 for the damping fluid. Accordingly, the only way for the damping fluid to travel from Chamber A to Chamber B during the compression stroke is via the flow channel 40 provided on the piston assembly. To further aid the seal in the compression stroke, further provided are two extended chamfers 62, that seals the inner diameter of the O-ring during the compression stroke. To ensure an adequate seal, the width of the chamfers 62 must be larger than the width of the protrusions 60. This arrangement is advantageous as it allows assembly with standard O-ring components.

Figure 21:
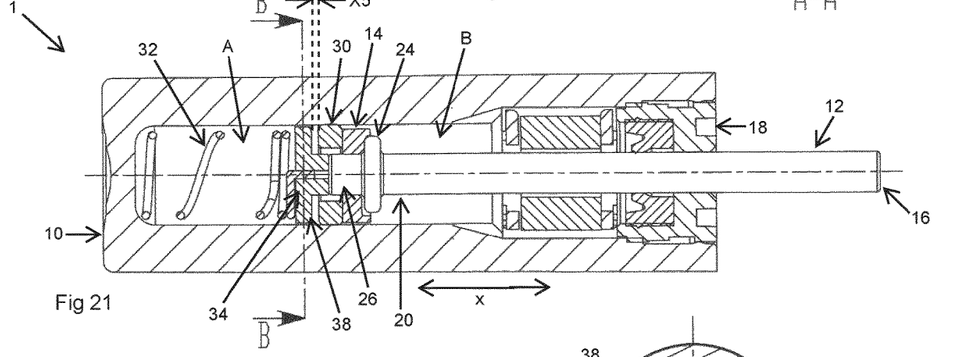
FIG. 21 shows a cross section of a damper of a fifth embodiment showing a compression stroke.
Figure 22:
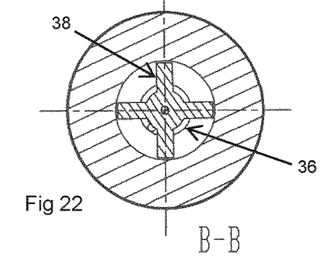
FIG. 22 shows a cross section of the damper of FIG. 21 through the line A-A.
Figure 23:
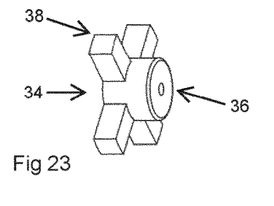
FIG. 23 shows the support means according to the fifth embodiment.

A fifth embodiment is shown in FIGS. 21 to 23. In this embodiment the return means 32 comprises a spring 32 and a support member 34. The support member comprises a cylindrical main body 36 and four ribs 38. More or fewer ribs 38 are possible. The cylindrical main body 36 may comprise an aperture that can receive a protrusion from the spring 32.

FIG. 22 shows a cross-section through the support member. This embodiment may use a piston assembly 14 as shown in either FIGS. 7 & 8 or FIGS. 12 & 13.

FIG. 21 shows the compression stroke of the damper 1. The piston rod pin 26 is engaged with the main body 36 of the support member 34. A gap X5 is maintained between the O-ring and ribs 38 of the support member 34. The gap constitutes the path of travel of the O-ring between the compression and return strokes. In the return stroke, the O-ring will be engaged with the ribs 38 of the support member, and a gap corresponding to X5 will be provided between the O-ring 30 and the piston assembly 14. This allows a greater path between chamber B and chamber A for the damping fluid because the damping fluid may pass over the grooves 28 on the outer surface of the piston assembly 14.

In all embodiments the piston assembly 14 engages with the seal 30, generally an O-ring, in the compression stroke. In the return stroke the O-ring 30 is disengaged with the piston assembly 14. The return means 32 engages with the O-ring 30 in the return stroke. In prior art arrangements the return means would engage with the piston assembly, which in turn would engage the seal.

Figure 24:
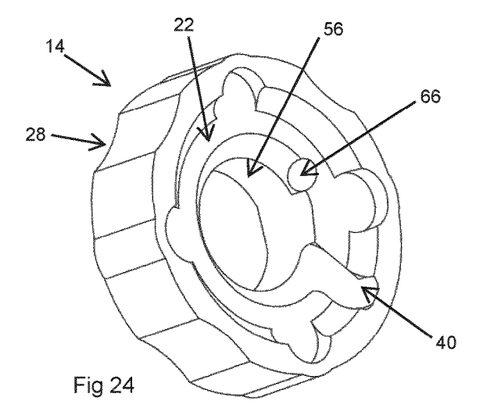
FIG. 24 shows a first view of an alternative piston assembly.
Figure 25:
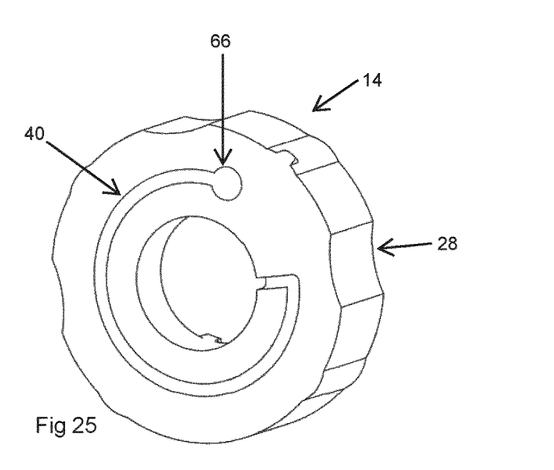
FIG. 25 shows a second view of the piston assembly of FIG. 24.

An alternative piston assembly 14 is shown in FIGS. 24 and 25. This piston assembly 14 may be used with any of the embodiments described above. The piston assembly 14 comprises a flow channel 40 on each face. Accordingly there is provided a first flow channel on the face that engages with the piston assembly 14 and a second flow channel that engages with the return means 32. By providing two flow channels 40 the length of travel of the damping fluid in the compression stroke is increased. The two flow channels 40 are connected by a through-hole 66. The damping fluid is thus urged around two flow channels during the compression stroke. Accordingly a high level of damping can be achieved with a relatively short damper.

The concepts of a circular groove/flow channel and a floating O-ring both allow for a size reduction in the damper 1. When both of these concepts are used together, significant size—both length and diameter—reductions of the damper can be achieved.

By allowing either direct or indirect engagement of the return means with the piston rod allows the O-ring to float between positions in the compression and return strokes.

Two further embodiments (sixth and seventh) will now be described in relation to FIGS. 26 to 35. Where possible the same reference numerals as in the earlier embodiments have been used. Features that perform the same function as described earlier will not be re-described.

The sixth embodiment is shown in FIGS. 26 to 30. There is provided a return means 32, a sealing means, a piston assembly 14 and a piston rod 12, as described earlier. In the present embodiment, the piston rod comprises a flange 24 operable to engage with the piston assembly 14. The section operable to engage with the return means 32 may be termed the piston rod pin 26.

Figures 26, 27, 28, 29, 30:
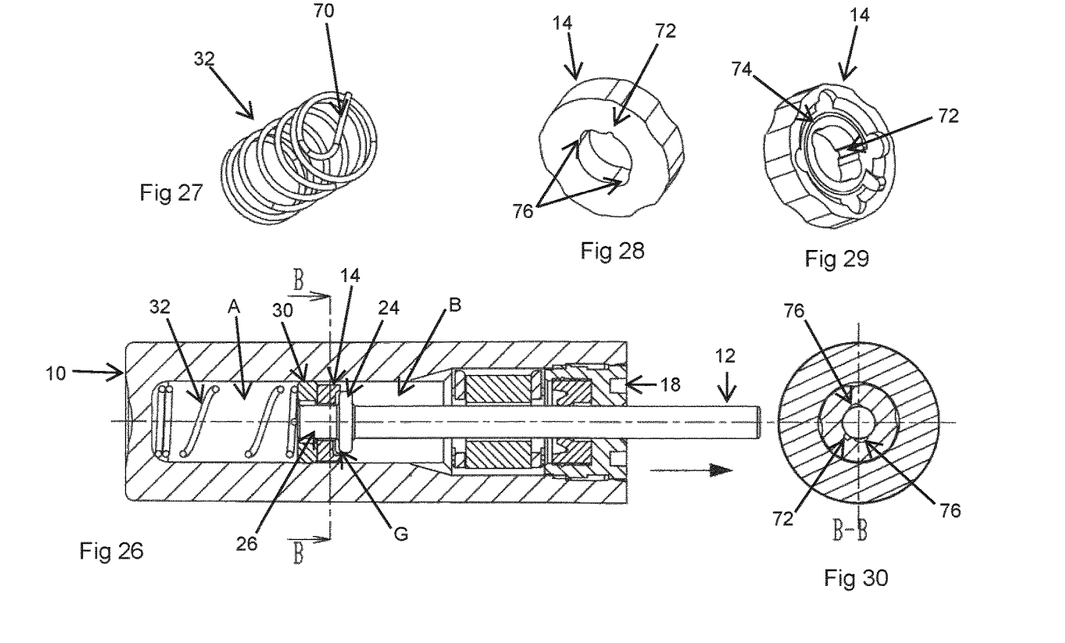
FIG. 26 shows a cross section of a damper of a sixth embodiment showing a return stroke.
FIG. 27 shows the return means according to the sixth embodiment.
FIG. 28 shows a first view of a piston assembly.
FIG. 29 shows a second view of the piston assembly of FIG. 28.
FIG. 30 shows a cross section of the damper of FIG. 26 through the line B-B.

The return means comprises a spring, with one end adapted to comprise a spigot 70. The spigot 70 comprises a bar adapted from the spring that is operable to engage with the piston rod pin 26.

A difference to previous embodiments is that the piston rod pin 26 extends beyond the position of the O-ring 30 in a damping stroke.

It will be noted from FIG. 28 and FIG. 29 that the piston assembly 14 comprises a first groove 72 etched into the wall of an aperture passing through said piston assembly 14 and a second semi-circular force definition groove 74 (shown in FIG. 29) that surrounds the aperture of the piston assembly. This is similar to the arrangement shown in FIGS. 7 and 8. In the present embodiment, the piston assembly 14 comprises two further grooves 76 configured to increase the return flow of damping fluid in the return stroke of the damper. A cross-section of the piston assembly is shown in FIG. 30. The first groove 72 and the two further grooves 76 are visible.

In this embodiment, the piston assembly is configured to float between the damper stroke and the return stroke in a similar manner to the sealing means in earlier embodiments. In the damping stroke the flange 24 on the piston rod 12 engages the piston assembly 14, and pushes both it and the sealing means against the return means 32. The damping fluid is forced from chamber A to chamber B via first groove 72 and second semi-circular force definition groove 74. On the return stroke the return means 32 pushes the piston rod 12 (via the piston rod pin 26) out of the damper housing. Because the piston rod pin 26 is longer than both the O-ring 30 and the piston assembly 14, both features can slide with respect to the piston rod pin 26. Thus, as is shown in FIG. 26, a gap G is created between the piston assembly and the flange. Accordingly, damping fluid can flow between the piston assembly and the flange, via the further grooves.

In a variation, the O-ring 30 and the piston assembly 14 could be fixed together. One option would be to have them glued, or the piston assembly could have integral retaining means.

A seventh embodiment is shown in FIGS. 31 to 35. In this arrangement the piston assembly 14 is adapted to include an elongate section 78 that acts to extend the piston rod pin 26. In this arrangement, the return means 32 engages with the elongate section 78. The flange 24 of the piston rod 12 maintains engagement with the piston assembly 14 throughout the damping and return strokes. In this arrangement the O-ring 30 can float between positions along the elongate section 78, in a manner described in previous embodiments.

Figures 31, 32, 33, 34, 35:
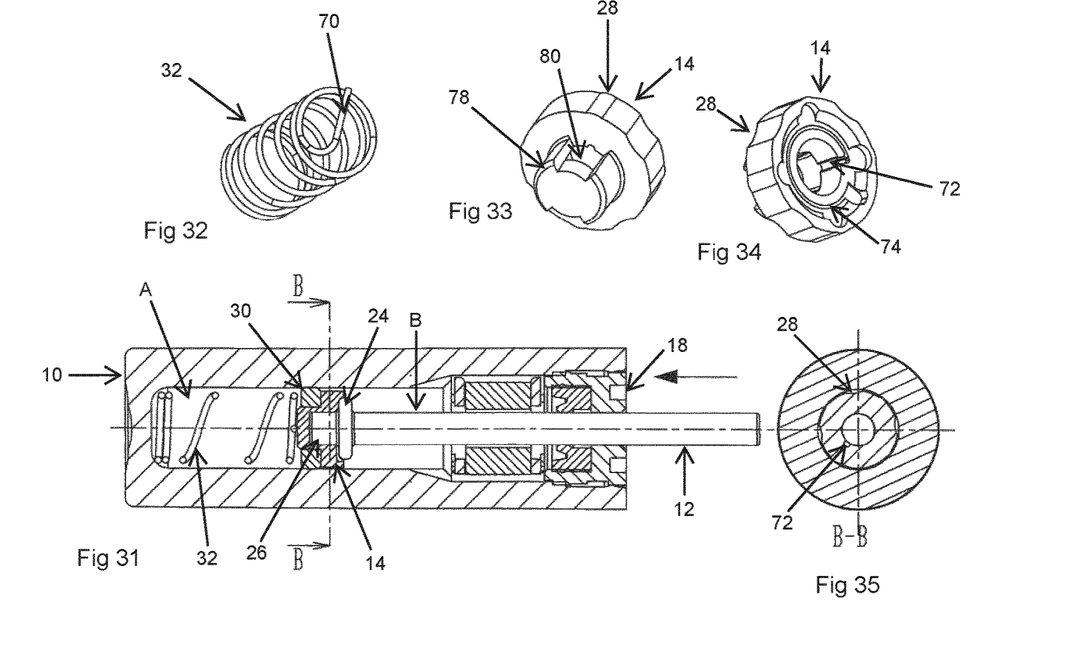
FIG. 31 shows a cross section of a damper of a seventh embodiment showing a compression stroke.
FIG. 32 shows the return means according to the seventh embodiment.
FIG. 33 shows a first view of a piston assembly.
FIG. 34 shows a second view of the piston assembly of FIG. 33.
FIG. 35 shows a cross section of the damper of FIG. 31 through the line B-B.

As shown in FIG. 34, piston assembly 14 comprises a first groove 72 etched into the wall of an aperture passing through said piston assembly 14 and a second semi-circular force definition groove 74 that surrounds the aperture of the piston assembly. In the compression stroke (damping stroke) the flange 24 on the piston rod 12 engages the piston assembly 14, and pushes it against the return means. The damping fluid is forced from chamber A to chamber B via first groove 72 and second semi-circular force definition groove 74. The piston assembly engages with the O-ring 30 to ensure that damping fluid cannot pass over the piston assembly; all damping fluid is forced through first and second grooves 72 and 74.

The elongate portion 78 of the piston assembly comprises means 80 to allow the damping fluid access to the first groove 72. In the example shown, this means 80 comprises a cut-out in the elongate section 78.

In the return stroke, the O-ring is urged away from the piston assembly (ie it can float towards the return means) so that damping fluid can pass over the piston assembly, facilitated by grooves 28. These are similar to the grooves 28 shown in the embodiment described in relation to FIGS. 7 and 8.

In both embodiments described in relation to FIGS. 26-35, the second groove 74 need not be circular. The length of the groove 74 defines the damping force. The longer the groove, the higher the damping force. For example, if a lower force is required, it would be possible to provide a short linear groove.

The preceding embodiments are provided by way to assist understanding, and many modifications and variations are available within the scope of the appended claims.

The invention claimed is:

1. A piston and cylinder type damper having a cylinder containing damping fluid operable to perform a compression stroke and a return stroke, the damper comprising:
   a piston rod engagable with a piston assembly and a return means, wherein said piston rod is operationally disposed with respect to a sealing means axially movable with respect to the piston rod such that said sealing means is operable to engage with both said piston assembly and said return means, such that, in said compression stroke the sealing means engages solely with said piston assembly, and in said return stroke engages solely with said return means, wherein:
   the sealing means is an O-ring, wherein the O-ring is in floating arrangement with the piston assembly and the return means,
   the return means comprises a spring and an optional support member, wherein the spring engages with the piston rod and the sealing means either directly or indirectly via the optional support member, and
   the piston assembly comprises a central aperture, and wherein the central aperture is substantially encircled by a flow channel.

2. A damper according to claim 1, wherein the piston assembly comprises an elongate section that acts to extend the piston rod.

3. A damper according to claim 2, wherein the sealing means is maintained on the elongate section, and is operable to move along said elongate section between limits defined by the piston assembly and the return means, depending on whether the damper assembly is performing a compression stroke or a return stroke.

4. A damper according to claim 3, wherein the return means directly or indirectly engages the elongate section during both the compression and return strokes.

5. A damper according to claim 1, wherein the O-ring comprises one or more protrusions to allow the O-ring to flex or deform during the return stroke.

6. A damper according to claim 5, wherein O-ring comprises grooves either side of the one or more protrusions.

7. A damper according to claim 1, wherein the piston assembly comprises one or more protrusions to allow the O-ring to flex or deform during the compression stroke.

8. A damper according to claim 7, wherein the piston assembly comprises chamfered portions located between the protrusions and the central aperture, wherein said chamfered portions are greater in width than the protrusions.

9. A damper according to claim 1, wherein the return means contactly engages with the piston rod during the compression and return strokes.

10. A damper according to claim 1, wherein the piston assembly comprises a counterbore operable to receive the piston rod.

11. A damper according to claim 1, wherein the flow channel is on the side of the piston assembly that faces the piston rod.

12. A damper according to claim 1, wherein the piston assembly comprises a flow channel on both sides.

13. A piston and cylinder type damper operable to perform a compression stroke and a return stroke, the damper comprising:
a piston rod;
a piston assembly, and
a return means,
wherein the piston rod and the return means are operable to engage in both the compression and return strokes independent of the piston assembly,
wherein the return means comprises a spring, and
wherein the piston assembly comprises an aperture therethrough, and wherein the piston rod includes a portion that is operable to pass through the aperture and directly engage with the spring.

14. A piston and cylinder type damper according to claim 13, wherein the return means and the piston rod engage via a support member.

15. A piston and cylinder type damper comprising:
a piston rod comprising a flange and a piston rod pin;
a return means;
a sealing means; and
a piston assembly, wherein, the piston rod pin has a length that is longer than the combined length of the sealing means and the piston assembly, when compared along a primary axis of the damper, and
wherein the piston rod pin engages with the return means on both a compression stroke and a return stroke, and both said sealing means and said piston assembly are operable to float with respect to the return means and the piston rod.

16. A damper according to claim 15, wherein the return means comprises a bar operable to engage the piston rod directly or via an elongate section.

* * * * *